US012769172B2

(12) United States Patent
Ghosh et al.

(10) Patent No.: US 12,769,172 B2
(45) Date of Patent: Oct. 20, 2026

(54) LOW-VOLTAGE HAZE TUNING ASSEMBLY AND METHOD

(71) Applicant: The Regents of the University of Colorado, Denver, CO (US)

(72) Inventors: Souvik Ghosh, Boulder, CO (US); Ivan I. Smalyukh, Boulder, CO (US); Eldho Abraham, Boulder, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 194 days.

(21) Appl. No.: 18/732,384

(22) Filed: Jun. 3, 2024

(65) Prior Publication Data

US 2024/0402557 A1 Dec. 5, 2024

Related U.S. Application Data

(60) Provisional application No. 63/470,772, filed on Jun. 2, 2023.

(51) Int. Cl.
*G02F 1/139* (2006.01)
*G02F 1/1339* (2006.01)

(52) U.S. Cl.
CPC ............ *G02F 1/139* (2013.01); *G02F 1/1339* (2013.01); *G02F 2201/02* (2013.01)

(58) Field of Classification Search
CPC .... G02F 1/139; G02F 1/1339; G02F 2201/02; G02F 1/1334
See application file for complete search history.

(56) References Cited

U.S. PATENT DOCUMENTS

2023/0115308 A1* 4/2023 Lundin ..................... D01F 8/04 523/205
2023/0152620 A1* 5/2023 Chen ................... G02F 1/13737 349/158
2023/0229042 A1* 7/2023 Butler ............... G02F 1/133784 349/56
2025/0250404 A1* 8/2025 Sakamoto .............. B82Y 40/00
2025/0296066 A1* 9/2025 Morimura ................ B01J 13/14

* cited by examiner

*Primary Examiner* — Mariam Qureshi
(74) *Attorney, Agent, or Firm* — Snell & Wilmer L.L.P.

(57) ABSTRACT

Haze tunable assemblies and methods of forming and using the assemblies are disclosed. Exemplary assemblies include two or more substrates and a composite liquid crystal material interposed between at least two of the substrates. Exemplary assemblies exhibit large variation in haze upon application of a relatively low voltage and can retain desired transmission of visible light transmission.

18 Claims, 5 Drawing Sheets

LOW-VOLTAGE HAZE TUNING ASSEMBLY AND METHOD

CROSS-REFERENCE TO RELATED APPLICATIONS

Figure 1:
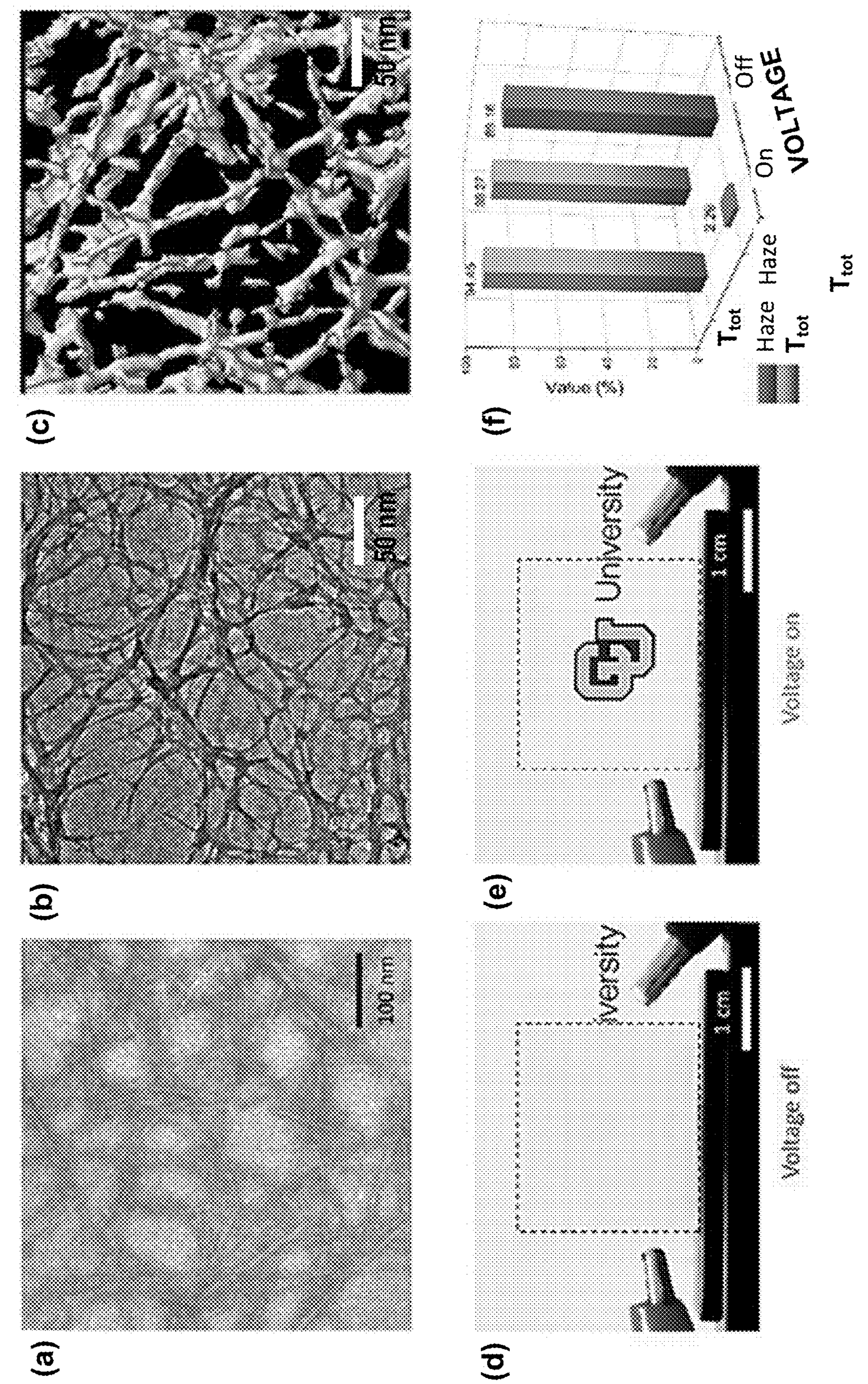

This application claims priority to U.S. Provisional Application No. 63/470,772, filed Jun. 2, 2023, and entitled LOW-VOLTAGE HAZE TUNING ASSEMBLY AND METHOD, the disclosure of which is hereby incorporated herein by reference.

STATEMENT REGARDING FEDERALLY SPONSORED RESEARCH OR DEVELOPMENT

This invention was made with government support under grant number DE-SC0019293 awarded by the U.S. Department of Energy. The government has certain rights in the invention.

FIELD OF THE DISCLOSURE

The present disclosure generally relates to haze tunable assemblies and methods More particularly, the disclosure relates to haze tunable assemblies that include composite liquid crystal material and to methods of using and forming the same.

BACKGROUND OF THE DISCLOSURE

Because of their potential for boosting energy efficiency and privacy features while enabling the main function of allowing natural light indoors, glazing products with tunable optical properties are generally desired. However, glazing products, such as windows and skylights with electric switching of haze and transparency are rare and often require high voltages or electric currents, and such glazing products generally do not fully meet the stringent technical requirements for glazing applications. Further, there is a desire to have glazing products that exhibit switchable optical haze without optical energy loss associated with, for example, absorption. Accordingly, improved tunable assemblies, such as glazing products, and methods of forming and using the tunable assemblies are desired.

Any discussion of problems and solutions set forth in this section has been included in this disclosure solely for the purpose of providing a context for the present disclosure and should not be taken as an admission that any or all of the discussion was known at the time the invention was made.

SUMMARY OF THE DISCLOSURE

While the ways in which various embodiments of the present disclosure address drawbacks of prior materials, assemblies, and methods are discussed in more detail below, in general, various embodiments of the disclosure provide improved haze-tunable assemblies and methods with desired properties, such as those described herein.

In accordance with examples of the disclosure, a haze-tunable assembly comprises a first substrate, a second substrate, a composite liquid crystal material interposed between the first substrate and the second substrate, a first contact layer between the first substrate and the composite liquid crystal material, and a second contact layer between the second substrate and the composite liquid crystal material. In accordance with various aspects of these embodiments, the composite liquid crystal material comprises liquid crystal material and a cross-linked unaligned (e.g., random) network of nanofibers. In accordance with further aspects, a haze of the composite liquid crystal material can be tuned by applying a bias across the first contact layer and the second contact layer. The nanofibers can be or include, for example, cellulose nanofibers. The composite liquid crystal material can further include spacers to facilitate maintaining desired distance between the substrates. A distance between the first substrate and the second substrate can be greater than zero and less than 10, 20, or 30 micrometers and/or less than 50, 100, or 150 micrometers and/or other distances as noted herein. Such a distance can correspond to a cross-sectional dimension of one or more of the spacers.

In accordance with further aspects, the liquid crystal material is nematic liquid crystal material. For example, the liquid crystal material can be or include one or more of 4-cyano-4'-pentylbiphenyl (5CB), MLC-9200-000, MLC-9200-100, MLC-6608, MLC-6241-000, 5PCH, 5CB, TL-216, E7, or E44. In accordance with further aspects, emergent domains of the liquid crystal material are larger than the average pore size of pores within the cross-linked unaligned network of nanofibers. For example, the emergent domains of the liquid crystal material can be between about 1 μm and about 10 μm.

To provide desired transparency, an average diameter of the nanofibers can be between about 3 nm and about 6 nm or other diameters noted herein. In accordance with examples of the disclosure, a total transmission of light of or through the assembly (e.g., though the substrates, contact layers, and the composite liquid crystal material) in the visible and/or near infrared region of the of the electromagnetic spectrum is greater than 80%, greater than 85%, or greater than 89% in both an off state and in an on state. In accordance with further examples, a difference of the total transmission of light in the visible and/or near infrared region of the of the electromagnetic spectrum in the off state of the assembly is within 10% or within 5% of a transmission of light in the visible and/or near infrared region of the electromagnetic spectrum of the assembly in the on state. As described below, in accordance with further examples, light transmitted through the assembly is color neutral.

In accordance with additional aspects of these embodiments, an average pore size of pores within the cross-linked unaligned network of nanofibers is between about 50 nm and about 200 nm.

In accordance with yet further examples of these embodiments, a haze coefficient of the composite liquid crystal material is less than 10, 5, or 3% in an on state and greater than 80, 85, or 90% in an off state. A difference of a haze coefficient of the composite liquid crystal material in an off state and a haze coefficient of the composite liquid crystal material in an on state can be greater than 75, 80, or 85 absolute percent. A driving voltage of the assembly is greater than zero V and less than 10 V, less than 8 V, or less than 5 V to obtain the variation in haze as described herein.

In accordance with additional embodiments of the disclosure, a method is provided. An exemplary method of tuning a haze of a tunable assembly, such as an assembly described above or elsewhere herein, includes providing the assembly, and applying a bias across the first contact layer and the second contact layer to thereby effect a change in a haze coefficient of the composite liquid crystal material of greater than 75, 80, or 85 absolute percent. In accordance with examples of these embodiments, a difference of a transmission of light in the visible and/or near infrared region of the electromagnetic spectrum in the off state of the assembly is within 10% or within 5% of a transmission of light in the visible and/or near infrared region of the electromagnetic spectrum of the assembly in the on state. In accordance with further examples, a total transmission of light in the visible and/or near infrared region of the electromagnetic spectrum is greater than 80%, greater than 85%, or greater than 89% in both an off state and in an on state. In accordance with further aspects, the total transmission is independent or substantially independent of light polarization.

In accordance with further embodiments of the disclosure, various articles are formed of or using an assembly as described herein. Exemplary articles include windows, security devices, skylights, and the like. An important consideration is that such articles can be operated in a relatively safe manner, because of the relatively low driving or operating voltages as described herein.

These and other embodiments will become readily apparent to those skilled in the art from the following detailed description of certain embodiments having reference to the attached figures; the invention not being limited to any particular embodiment(s) disclosed. The foregoing summary and the following detailed description are exemplary and explanatory only and are not restrictive of the disclosure or the claimed invention.

BRIEF DESCRIPTION OF THE DRAWING FIGURES

A more complete understanding of exemplary embodiments of the present disclosure can be derived by referring to the detailed description and claims when considered in connection with the following illustrative figures.

FIG. 1 illustrates fabrication of a composite liquid crystal material in accordance with examples of the disclosure; (a) illustrates a transmission electron microscopy (TEM) image of individualized TEMPO-oxidized cellulose nanofibers negatively stained with 1% phosphotungstic acid solution; (b) illustrates TEM image of the cross-linked network of nanofibers. (c) illustrates tomographic TEM visualization of the network showing porous structure; (d) and (e) illustrate CNLC in opaque and transparent states with a CU logo placed behind the cell, without and with applied voltage; (f) illustrates a comparison of the haze coefficient and total visible transmission of the CNLC cell with and without applied voltage.

Figure 2:
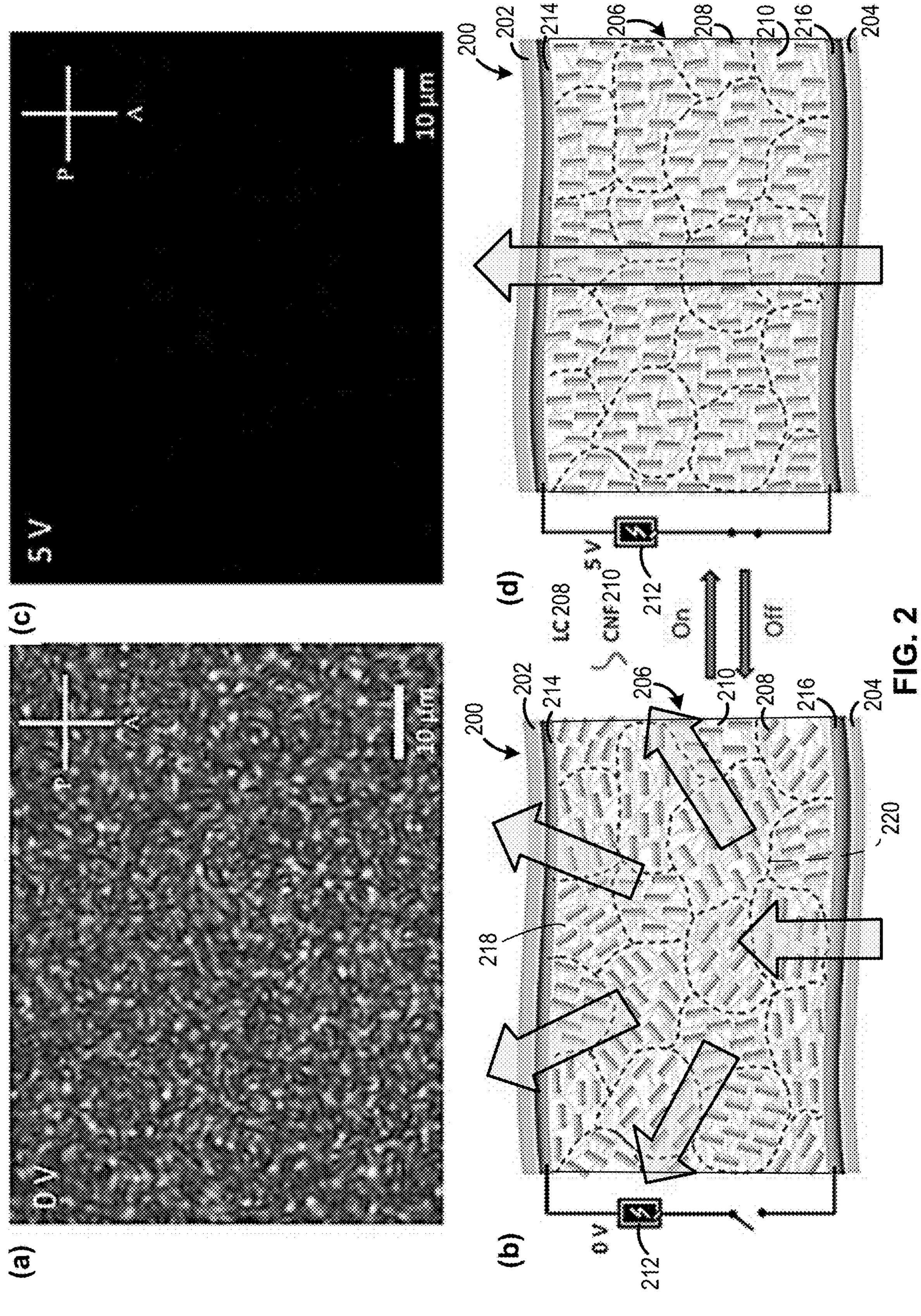

FIG. 2 illustrates a mechanism of reversible haze switching; (a) optical microscopy image of CNLC without voltage under crossed polarizers showing micrometer-sized LC domains; (b) illustrates schematic illustration of emerging domains larger than the pores of the CNF network and associated scattering of incident illumination from the non-homogeneous, multidomain gel in the default state (not to scale); (c) illustrates polarized optical microscopy image of CNLC gel at 5 V; (d) illustrates a schematic demonstration of low-voltage transition of CNLC gel to homogeneous transparent state due to realignment of LC domains under external electric field (figure not to scale).

Figure 3:
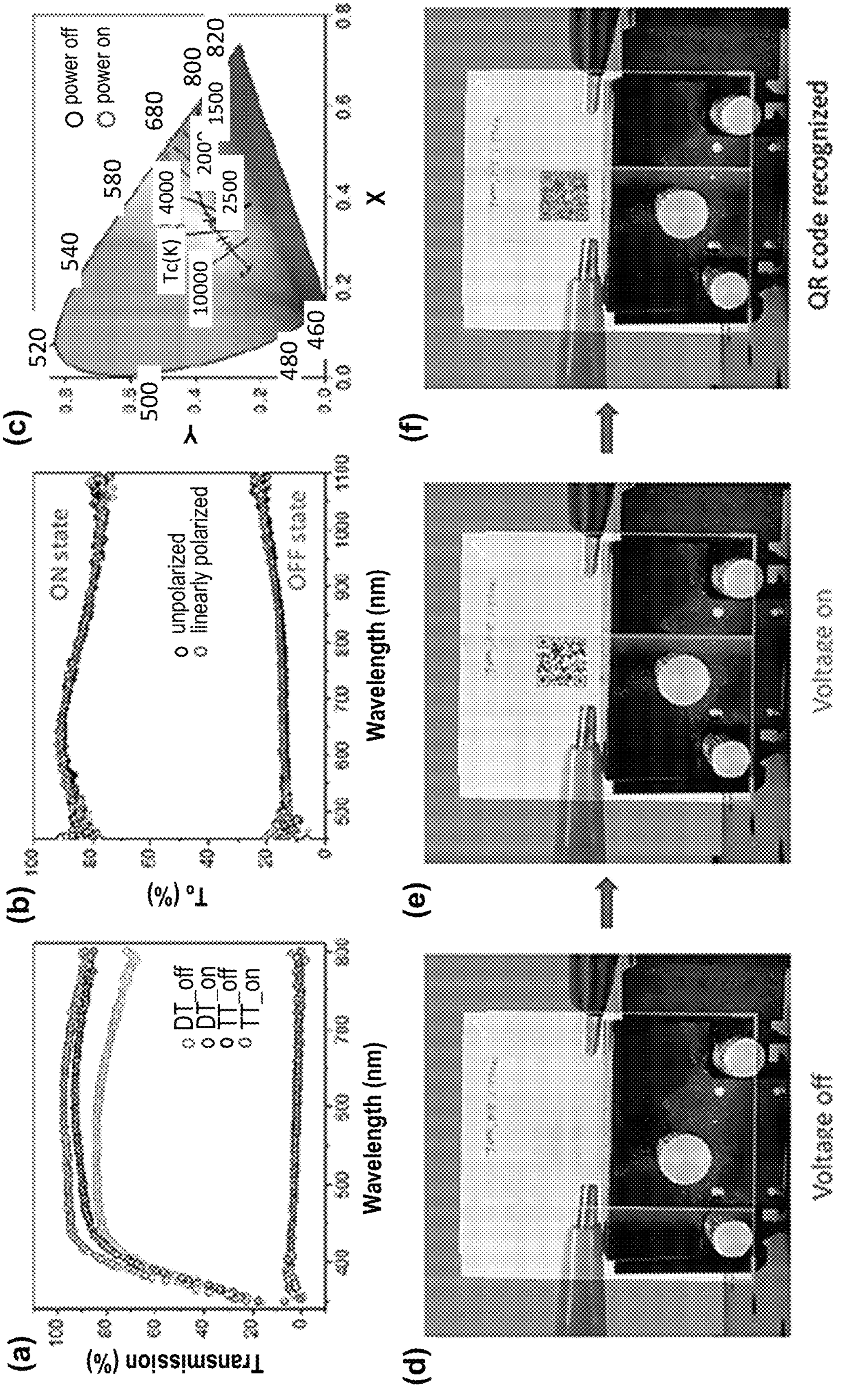

FIG. 3 illustrates optical properties of CNLC gel and corresponding applications in accordance with examples of the disclosure; (a) illustrates visible-range spectral dependence of total and diffuse transmittance in CNLC gel with and without voltage; (b) illustrates spectral dependence of direct transmission using unpolarized and linearly polarized light with and without voltage; (c) illustrates perceived color and color temperature of the CNLC gel in between two ITO-coated glass substrates represented in the CIE1931 chromaticity diagram—a black arrow marks the location of color coordinates on the diagram; (d)-(f) illustrate information protection and on-demand detection of QR code through the CNLC cell—without the voltage the QR code is blocked which again becomes visible as soon as the voltage is applied—a blue color on the QR code confirms the detection.

Figure 4:
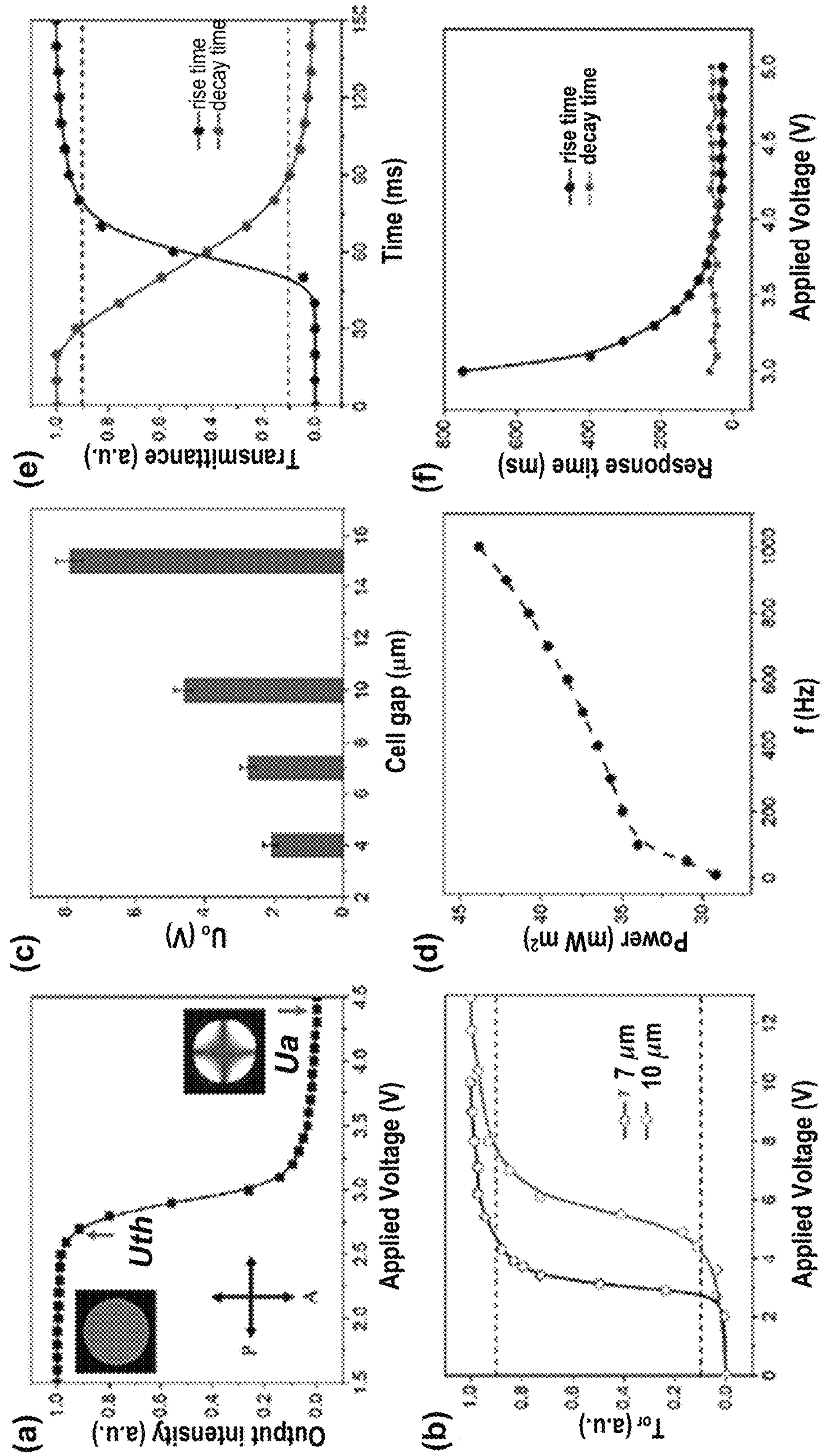

FIG. 4 illustrates electro-optic response of the CNLC gel (assembly) in accordance with the disclosure; (a) illustrates transmission between two crossed polarizers as a function of applied voltage at 1 KHz for 7 μm thick CNLC cell—the blue and green arrows indicate the threshold voltage $U_{th}$ and driving voltage $U_d$, respectively—the conoscopic images corresponding to 0 V and 5 V are shown in the inset; (b) illustrates direct transmission as a function of applied voltage plot for 7 μm and 10 μm cell gap; (c) illustrates threshold voltage vs cell thickness plot; (d) illustrates electric power consumption in driving a 7 μm thick CNLC cell at different frequencies; (e) illustrates typical dependencies of direct transmitted intensity used to determine the response time of CNLC at $U_d$=5 V; (f) illustrates rise and decay time versus applied voltage plot—the output intensity change between the two dashed lines (0.1 and 0.9) in (e) is used to determine the switching times.

Figure 5:
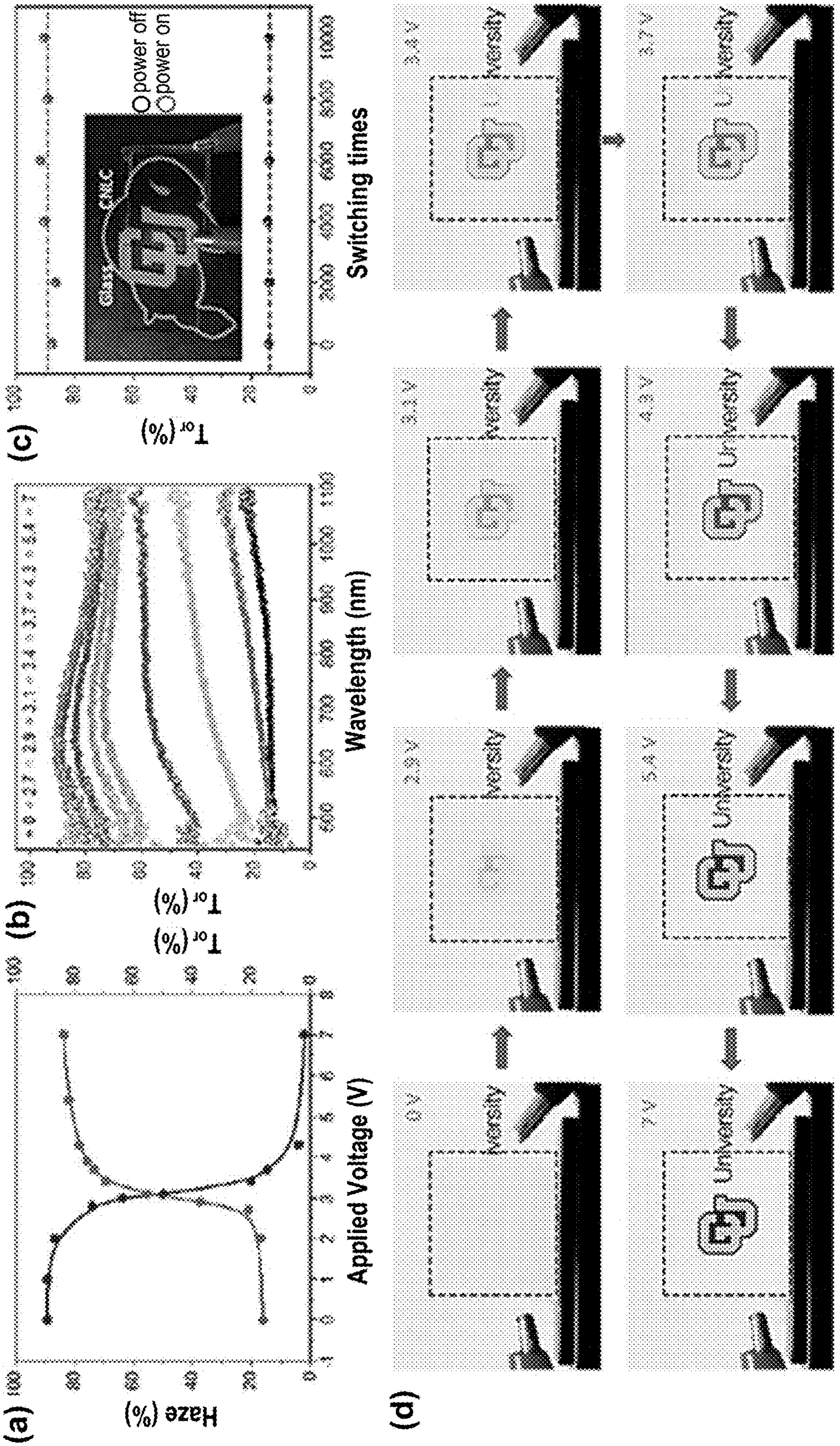

FIG. 5 illustrates voltage dependent optical characterization of a CNLC gel in accordance with examples of the disclosure; (a) illustrates haze coefficient and direct transmittance plot at different voltages; (b) illustrates spectral dependence of direct transmission at different voltage levels; (c) illustrates direct transmittance of CNLC cell in the OFF state and ON state as function of number of switching cycles to study the durability of CNLC gel—the appearance of the cell after the final switching cycle in comparison with a cleaned glass substrate is shown in the inset; (d) illustrates a photograph of CU logo imaged through CNLC cell under different voltages.

It will be appreciated that elements in the figures are illustrated for simplicity and clarity and have not necessarily been drawn to scale. For example, the dimensions of some of the elements in the figures may be exaggerated relative to other elements to help to improve the understanding of illustrated embodiments of the present disclosure.

DETAILED DESCRIPTION OF EXEMPLARY EMBODIMENTS

Although certain embodiments and examples are disclosed below, it will be understood that the invention extends beyond the specifically disclosed embodiments and/or uses thereof and obvious modifications and equivalents thereof. Thus, it is intended that the scope of the invention disclosed should not be limited by the particular disclosed embodiments described below.

As set forth in more detail below, various embodiments of the disclosure relate to haze tunable assemblies and to methods of forming and using the assemblies and/or articles that include and/or are formed using the assemblies. Exemplary assemblies include a composite liquid crystal material. The composite liquid crystal material includes liquid crystal material and a cross-linked unaligned network of nanofibers.

The assemblies with the composite liquid crystal material can exhibit a low-voltage tuning of the haze coefficient of the assemblies or articles including the assemblies in a broad range of, for example, about 2-90%, while maintaining high visible-range optical transmittance. Exemplary composite liquid crystal material includes a nanocellulose fiber gel network infiltrated by a (e.g., nematic) liquid crystal, which can be switched between polydomain and monodomain spatial patterns of optical axis via a dielectric coupling between the nematic domains and the applied external electric field. Characterization of physical properties relevant to window and smart glass technologies, like the color rendering index, haze coefficient, and switching times, demonstrate that the disclosed assemblies and methods can meet the stringent requirements of the glass industry, including applications such as privacy windows, skylights, daylighting and greenhouse coverings.

The composite liquid crystal material can be considered as a gel. The term gel as used herein can refer to the composite liquid crystal material. Gels are an important class of soft matter systems that are composed of a liquid-like or gas-like medium entrapped in a three-dimensional cross-linked host network. Gels can exhibit a variety of physical properties, depending on their structure and composition at mesoscale. Structural variation in gels can lead to tunable light propagation effects, which can be desirable for designing glazing products, such as windows and skylights. Complex light scattering arising from nano- to micro-meter-sized structures in composite systems can allow for adjustable optical transparency in the visible and near-infrared (NIR) wavelengths of light, while, for example, maintaining high overall transmission. This can be desirable for tuning fundamental light transport effects in disordered media and be useful for diverse optical applications and boosting the efficiency of optoelectronic devices.

Control on local structure and composition in disordered medium including gels/composite liquid crystal materials is highly desired. Such control enable selective influence of optical diffusion of the transmitted light while ensuring unimpeded total light transmission. In this regard, electrically induced effects provide fast, robust, and dynamic control of materials properties that, in turn, modulate the optical behavior of a system. Alternative methods based on thermal, optical and humidity-triggered stimulations offer only passive operation. Despite several emerging materials and technologies, possibilities to actively manipulate the ensuing optical properties in gel-like systems are still limited, rarely scalable and often require high electrical energy input, which is a widely recognized technological challenge. Although high transmission and high haze properties have been achieved in conventional gel-like materials developed from isotropic constituents in a static manner, a suitable composition with optically anisotropic materials as set forth herein promises to enable orientation-dependent properties that can be regulated externally with weak stimuli like fields. In this direction, gel materials with combinations of isotropic host network and anisotropic guest liquid or vice versa have been investigated, where one of the components is optically anisotropic. For example, a cross-linked network of birefringent cellulose nanofibers infiltrated by isotropic fluids like air and water results in aerogels and hydrogels with anisotropic physical and optical properties. Subsequently, the integration of anisotropic fluids such as liquid crystals (LC) into networks of amorphous polymers forms composites whose properties can be modulated using electrical stimulation. Until now, electrically driven dynamic optical scattering from the polymer-liquid crystal (P-LC) composite materials has been the most successful approach for regulating optical transparency with reduced optical scattering losses in the visible and NIR wavelengths. The fast rotation of the LC director with respect to the applied electric field in different types of LC-based composites such as polymer-dispersed LCs (PDLCs), polymer-stabilized LCs (PSLCs), polymer-stabilized cholesteric textures (PSCTs), and nematic gels with aligned network of fibers offer a fast and consistent optical response, which is necessary for practical applications. The robust and reliable modulation of optical transparency in P-LC composite materials has shown potential impacts in diverse optical technologies ranging from smart windows, information displays to vision therapy, optical security devices, and many more. Yet, electrical switching in P-LC composites, including the commercially successful PDLCs, suffers from the requirement of a high driving voltage, which is a key limiting factor for smart glass applications, especially in terms of power efficiency and both costs and safety considerations associated with high-voltage wiring of window units. These fundamental problems, along with the challenges of scalable, cost-effective manufacturing, have hindered the widespread adoption of P-LC materials for building-envelope technological applications. Similar drawbacks also exist in alternate modes for controlling optical transmission with electrochromic materials and suspended particle devices. These methods provide a broadband optical response covering UV to Vis-NIR wavelengths but rely primarily on absorption mechanism for optical tunability. They also have significantly slower response time (several minutes) as well as higher cost and energy input compared to LC-based systems. In recent years, self-powered devices that rely on energy harvesting technologies such as solar cells, tribo-electric nanogenerators and droplet-based electricity generators have been explored for P-LC switching. These mechanisms show a great promise in providing the required high voltage for modulating P-LC optical characteristics without consuming conventional electrical energy. Despite that, apart from additional cost and integration complexities, these self-powering mechanisms have some basic limitations that depend on several external factors such as weather conditions, pollution concerns, requirement of continuous and large input of external forces, mechanical abrasions during running, and the like. The challenge that emerges is, therefore, how to achieve a loss-less composite material with tunable optical properties and have potential for scalable as well as cost-effective manufacturing, enabling low-voltage manipulation of haze, without compromising the essential qualities of smart glazing, i.e., simple operation, customer safety, fast response, color-neutral appearance, independent of light polarization and durable switching cycles. Most importantly, such operation has never been combined with the demonstration of low-haze clear window state being switched to high-haze daylighting state of glazing, despite of being in a great demand. The assemblies and methods described herein address such issues.

In accordance with examples of the disclosure, by weakly coupling (e.g., nematic) LC molecules to a cross-linked three-dimensional network of ultrathin anisotropic (e.g., cellulose) nanofibers (CNF), a haze-switch technology with unprecedented power efficiency, ultra-high visible-range transmittance, and material properties desirable for smart glass-related applications, is provided. Exemplary assemblies, also referred to herein as cellulose-network liquid crystal (CNLC) or sometimes CNLC gel exhibits electro-optic characteristics that enable facile control of light-matter interaction, demonstrating excellent transparency tunability (~90%) within a millisecond timescale while maintaining high overall transmission (>90%) at a record-low operating voltage (~3-5 V), consuming at least 100 times less electrical power than conventional P-LC-based composites. The observed threshold characteristics and emergence of micrometer-scale nematic domains that lead to dynamic optical response has been explained with phenomenological models accounting for the elastic, dielectric, and surface anchoring properties of LCs. The anchoring energy estimated from modelling closely correlates with the experimental findings, thereby confirming weak-boundary-coupling conditions, which is highly sought after in switchable composite LC gels. As set forth below, optically anisotropic constituents within the mesostructured CNLC gel produce strong optical scattering from electrically controlled spatially varying optical inhomogeneities arising from anisotropic optical interactions of the gel with spatially varying optical axis orientation. We demonstrate how a state with high optical haze (~90%) is switched to a low-haze (~2%) state within over $10^4$ operating cycles without performance degradation, with the overall functioning of the CNLC gel in both states being uniform, color-neutral, and independent of light polarization. Our approach, dubbed "Haze-Switch," promises technological utility in many glazing products ranging from privacy windows to daylighting.

FIG. 2 (*b*) and (*d*) illustrates a haze tunable assembly 200 in accordance with examples of the disclosure. Haze tunable assembly 200 includes a first substrate 202, a second substrate 204, and a composite liquid crystal material 206 interposed between first substrate 202 and second substrate 204. First substrate 202 and/or second substrate 204 can be or comprise glass, plastic, or any other flexible substrate. Composite liquid crystal material 206 includes liquid crystal material 208 and a cross-linked unaligned network of nanofibers 210. Haze tunable assembly 200 also includes a first contact layer 214 between first substrate 202 and composite liquid crystal material 206 and a second contact layer between second substrate 204 and composite liquid crystal material 206. A haze of composite liquid crystal material 206 can be tuned by applying a bias from a voltage source 212 across first contact layer 214 and second contact layer 216. As set for in more detail below, the liquid crystal material can be or include nematic liquid crystal material, such as one or more of: 4-cyano-4'-pentylbiphenyl (5CB), MLC-9200-000, MLC-9200-100, MLC-6608, MLC-6241-000, 5PCH, 5CB, TL-216, E7, or E44.

An average diameter of the nanofibers 210 can be between about 3 nm and about 6 nm or be between about 2 nm and about 8 nm or be between about 1 nm and about 10 nm. A length of nanofibers 210 can be e.g., between about 100 nm to 100,000 nm or between 200 and 90,000 nm, or between about 50 and 80,000 nm. The nanofibers can comprise or be formed from cellulose nanofibers.

An average pore size of pores 218 within the cross-linked unaligned network of nanofibers can be between about 50 nm and about 200 nm. In accordance with examples of the disclosure, emergent domains 220 of the liquid crystal material are larger than the average pore size. Emergent domains of the liquid crystal material can be between, for example, about 1 μm and about 10 μm.

A total transmission of light of assembly 200 in the visible and/or near infrared region of the of the electromagnetic spectrum is greater than 80%, greater than 85%, or greater than 89% in both an off state and in an on state. A difference of the total transmission of light in the visible and/or near infrared region of the of the electromagnetic spectrum in the off state of the assembly is within 10% or within 5% of a transmission of light in the visible and/or near infrared region of the of the electromagnetic spectrum of the assembly in the in on state. Light transmitted through assembly 200 can be color neutral.

A haze coefficient of composite liquid crystal material 206 can be (e.g. greater than zero and) less than 10, 5, or 3% in an on state and (e.g., less than 100% and) greater than 80, 85, or 90% in an off state. A difference of a haze coefficient of composite liquid crystal material 206 in an off state and a haze coefficient of composite liquid crystal material 206 in an on state can be greater than 75, 80, or 85 absolute percent.

A driving voltage of the assembly can be less than 10 V, less than 8 V, or less than 5 V and greater than) and/or greater than 1 V.

In accordance with further examples of the disclosure, a method of tuning a haze of a tunable assembly is provided. An exemplary method includes providing an assembly as described herein and applying a bias across the first contact layer and the second contact layer to thereby effect a change in a haze coefficient of the composite liquid crystal material of greater than 75, 80, or 85 absolute percent or other percentage noted herein. A difference of a transmission of light in the visible and/or near infrared region of the of the electromagnetic spectrum in the off state of the assembly can be within 10% or within 5% of a transmission of light in the visible and/or near infrared region of the of the electromagnetic spectrum of the assembly in the in on state. A total transmission of light in the visible and/or near infrared region of the of the electromagnetic spectrum can be greater than 80%, greater than 85%, or greater than 89% in both an off state and in an on state. Further, the total transmission can be independent of light polarization.

In accordance with further examples of the disclosure, a window, security device, skylight, and/or other article can include a haze tunable assembly as described herein.

The examples provided below illustrate particular exemplars of the disclosure. Unless otherwise noted, the particular examples below are not meant to limit the scope of the invention.

Examples

For the fabrication of an exemplary CNLC cell or a haze tunable assembly, at first, the CNFs are synthesized using an oxidation process, such as 2,2,6,6-tetramethylpiperidine-1-oxyl (TEMPO) radical-mediated oxidation of native cellulose derived from wood pulp (described more detail below). The choice of nanocellulose as a host matrix for the LC fluid is well justified, not only for its natural abundance, low-cost fabrication, and intrinsic sustainability but also for its excellent mechanical flexibility for scalable manufacturing, ultrahigh optical transparency, and strong optical anisotropy. The as-synthesized nanofibers are hundreds to thousands of nanometers long (e.g., 100 nm to 100,000 nm) with a diameter of only about 3-6 nm (FIG. 1(*a*)) and exhibit crystalline structures and birefringence. The nanofibers are stably dispersed in water as individual fibers by exploiting the electrostatic repulsion of their surface charges associated with carboxylate anions. In the illustrated example, an aqueous dispersion of such CNFs is mixed with silica spacers with micrometer-range diameters (e.g., having a dimension of about 1 to about 30 micrometers or from about 2 to about 25 micrometers or less than 10, 20, or 30 micrometers and/or greater than 1, 5, or 10 micrometers. (which will define the gap thickness between the glass substrates) and placed between two substrates. Upon cross-linking of the fibers by hydrogen bonding between carboxyl groups, a three-dimensional network forms, as shown in FIG. 1(*b*). The 3D network of cellulose nanofibers is highly porous with a randomly distributed irregular pore size. Finally, the CNLC is formed after infiltrating the network with a small-molecule thermotropic LC, 4-cyano-4'-pentylbiphenyl (5CB), that follows multiple solvent exchange steps (see below for details). The as-prepared CNLC gel when sandwiched between two substrates coated with transparent and conducting material (e.g., indium tin oxide (ITO)) on their inner surfaces, can be switched electrically by applying voltage across cell due to the dielectric coupling between the LC molecules and the applied electric field. Initially, in the voltage-off state, the CNLC film appears opaque at room temperature obscuring its background (see FIG. 1(*d*)). The LC director (average orientation of rod-like organic molecules) forms irregularly aligned polydomain structure with domains impacted by but not following the network of CNFs which also has a substantially different refractive index ($\Delta n \sim 0.1$) from the LC medium. Consequently, the incident light is strongly scattered by the composite liquid crystal material. Upon application of voltage, the optic axis of the positively anisotropic LC material rotates and gets uniformly or substantially uniformly aligned perpendicular to the substrate, following the applied electric field. With the composite design under an appropriate choice of refractive index of the LC material that matches (e.g., within one percent) with that of the CNFs, the film can scatter light minimally and become transparent, clearly displaying the image (University of Colorado logo) in its background (see FIG. 1(*e*)). Once the applied field is removed, the surface interactions return the nematic LC to its randomly aligned opaque state. A demonstration of the transparency-switching CNLC smart glass, changing between the hazy OFF-state and transparent ON-state multiple times confirms the fully reversible and repetitive nature of the electric switching mechanism. The measured contrast in the haze coefficient $\Delta H \approx 87\%$ and total visible transmittance $\Delta T_{tot} \approx 5\%$, before and after application of voltage has been shown in FIG. 1(*f*). This finding illustrates the haze switching concept, which provides the transparency tuning capability of the CNLC gel while offering high overall light transmittance maintained in the transparent and opaque states.

FIG. 2 reveals and illustrates the switching mechanism of the CNLC cell, without and with applied (e.g., AC) voltage. Inside the network of CNFs, the LC free energy has contributions from both bulk elastic free energy ($F_b$) associated with director deformations and surface energy ($F_s$), which scale as K R and W $R^2$, respectively, where K is the average Frank elastic constant, W is the surface anchoring strength and R is the effective dimension. The ratio of these two energies $F_s/F_b$ yields $R/l_e$, where $$l_e = K/W$$

is the de Gennes-Kléman extrapolation length. For LC in composite systems with a randomly oriented network the competition between $F_s$ and $F_b$ determines the equilibrium molecular arrangements. Therefore, under a weak surface anchoring condition in small domains bulk elastic effects dominate. If the characteristic length of the network (i.e., pore size) L is smaller than $l_e$, then the energetically favorable configuration is the one which minimizes the bulk elastic energy $F_b$. Since the nematic subsystems are interconnected, the elastic energy reduced is greater than the energy increased due to the surface misalignment. Consequently, the director field can be uniform over lengths larger than the typical pore size L of the CNLC network. In the illustrated examples, the extrapolation length $l_e$ is of the order of a micrometer arising from weak surface anchoring strength of the network. For $L<l_e$, a typical domain size can be estimated from the analytical expression $$R/l_e \approx L/l_e + l_e/L,$$

considering the random-field arguments of Imry and Ma. Taking a typical pore size $$L \sim 100 - 200 \text{ nm},$$

the average domain size R is found out to be around 5-10 μm. We note that because of the simplifying assumptions the approximate values of R must be considered as order-of-magnitude estimates only. Domains with similar micrometer length scales indeed have been observed experimentally (see FIG. 2(*a*)), in accordance with the Imry-Ma argument that explains the instability of an ordered state of a very large system against a random field even if that is much weaker than the interactions favoring the ordering. Due to the existence of weak and random surface interactions, the long-range nematic order is split into nearly uniform domains of characteristic dimension R, which is larger than the typical pore dimensions of the network as shown schematically in FIG. 2(*b*). These randomly oriented emerging microscopic domains 220 of spatially varying director orientation and refractive index work as the light-scattering centers. In addition to that, the refractive index mismatch between the fibers, LC, and a large number of emerging nematic domains strongly diffuse the light propagating through the gel. The TEMPO-oxidized cellulose nanofibers (TOCN) are crystalline which shows anisotropic polarization-dependent refractive indices that also depend on the degree of crystallinity. Considering the slightly imperfect cellulose crystal orientation and coexisting amorphous contents the refractive index of TOCN is estimated to be $$n_e^{TOCN} \approx 1.59$$

for normally incident light polarized along the fiber and $$n_o^{TOCN} \approx 1.53$$

for the polarization in the transverse direction, where $n_e$ and $n_o$ are the extraordinary and ordinary refractive indices, respectively. Also, as reported in literature, for TOCN thin film the average refractive index was found to be, $$n_{avg}^{TOCN} = 1.545 \pm 0.002,$$

which closely agrees with the estimated value $$\left(n_{avg}^{TCON} = \frac{n_e^{TOCN} + n_o^{TOCN}}{2} \approx 1.56\right).$$

On the other hand, 5CB in its nematic phase (at temperatures below 35° C.) is also a birefringent optical material having two different refractive indices along its long and short axis. For 5CB, the extraordinary refractive index is $$n_e^{5CB}1.716$$

and the ordinary refractive index is $$n_o^{5CB}1.531,$$

at 589 nm and 25° C. When unpolarized light passes through this randomized network, depending on the light polarization and orientation of nematic domains, a strong mismatch of refractive indices and its spatial inhomogeneity produce large scattering of light in the CNLC film. Additionally, director fluctuations in the nematic state of 5CB also contribute to scattering, albeit this contribution is relatively small for the used thicknesses of the CNLC slabs. As a result, CNLC in the voltage-off state has a hazy appearance due to the combined effect of multiple scattering effects described above.

Subsequently, with the application of voltage in between the conductive (e.g., ITO) surfaces, the CNLC switches to a transparent state. In response to the applied voltage, the director and molecules of 5CB with strong positive dielectric anisotropy reorient themselves vertically following the electric field, yielding the extinction of light under crossed polarizers (FIG. 2(*c*)). Therefore, in the ON state, only the ordinary refractive index of 5CB becomes relevant as the LC director becomes parallel to the light propagation direction under normal incidence, yielding only the ordinary mode of light propagation. Consequently, the nematic domains of spatially varying director orientation and refractive index disappear, turning the CNLC into a clear, homogeneous optical medium, thereby hugely reducing the scattering as illustrated in FIG. 2(*d*). Additionally, in the presence of the applied field, the director fluctuations of 5CB medium are partly suppressed, also leading to lower scattering. As a result, as shown in FIG. 3(*a*), in the ON state the CNLC cell (haze tunable assembly) shows very high transparency in the visible wavelengths. Only a fraction of incident light gets scattered effectively giving a weak diffused transmission $T_{dif}$=2.1%, thanks to the nearly matching of refractive indices (Δn~0.01) between the TOCN film and the surrounding LC medium with vertically aligned 5CB molecules. The nature of this weak light scattering in the clear state is mainly Rayleigh-type as observed from the stronger scattering of blue light compared to longer wavelength red light. On the other hand, when the voltage is turned off the light diffusion jumps up to $T_{dif}$=79.6%, turning the cell opaque almost instantaneously, but the overall transmittance drops only slightly to $T_{tot}$=89.27%. From the presence of large scattering LC domains that are comparable to or larger than the incident light wavelengths, most of the incident light gets scattered along the forward direction which is consistent with Mie-type scattering.

A UV-Vis spectrophotometer with a reliable detection range of 350-800 nm is used for measuring total and diffused transmittance, revealing changes of transmission and haze with switching. We have also tested the CNLC cell under polarized illumination in FIG. 3(*b*). To characterize any effect of incident light polarization even on the microscopic scale, the direct optical transmission of a tiny region of the sample was collected using a microscope and analyzed with a portable spectrometer mounted on it. Over a wide range of wavelengths from 400 nm to 1100 nm, the optical response under polarized light remains nearly identical to unpolarized illumination. This confirms that the optical tunability is independent of light polarization for normally incident light, differently from gels with orientationally aligned fibers that scatter light depending on the direction of polarization leading to a reduced optical contrast. Therefore, the CNLCs can be effectively used for applications under ambient light without requiring any polarizing optical elements.

Another key factor for practical applications is the color-neutral appearance of the cell (also referred to herein as an assembly). To quantify the color-neutral appearance, a calculated color perception indices using the CIE 1931 xy color space, designed to represent the visual color perception of human eye, was used. By analyzing the transmitted light from the CNLC cell we obtain chromaticity coordinates of (0.33958, 0.34111) for the OFF state, which changes only slightly to (0.3365, 0.33697) with an application of voltage. In both cases, chromaticity coordinates are situated in the grey region of the diagram (FIG. 3(*c*)), representing excellent color neutrality. The polarization-independent and color-neutral optical response, along with negligible scattering loss of the CNLC gels enable technological advances in smart windows and glasses, polarizer-free information displays, and information security. A specific example toward an application in information security has been shown in FIG. 3(*d*)-(*f*), where the CNLC smart glass (as assembly) is used for QR code protection and recognition. CNLC in its passive state always protects the QR code disabling the smartphone camera to access any (sensitive) information, thereby providing the desired information security. Once the CNLC cell is powered on, the QR code appears and is recognized immediately. This demonstration exhibits that the CNLC cell can act as an additional physical security layer preventing access to visual information without the end-user authorization on imaging devices connected to the internet such as smartphone cameras, webcams, and indoor cameras providing Internet of Things (IoT) privacy and security. Similar function is also possible in machine vision operations for iris recognition and finger-vein biometrics that uses 850-1000 nm near-infrared (NIR) band, owing to the broadband optical response of the CNLC extending into the NIR wavelengths. The existing securing methods usually have a physical cover, and/or indicator lights whose operation depends on manual action, are often neglected due to various reasons or even can be disabled covertly. There is a growing awareness and concern among users regarding camera privacy. Therefore, a fail-proof solution is highly desired that can automatically cover a camera when not in use. Pertaining to the micrometer-scale thickness, compatibility with LC display technology, low-voltage operation, and default privacy state, the switchable CNLC gel has the potential to get seamlessly integrated into miniaturized chip-scale devices and coexist with other optical techniques for information security and authentication.

To characterize the switching behavior of the CNLC cell in response to the applied field, the CNLC gel is observed with polarizing optical microscopy by placing the sample between two crossed polarizers. Initially, at the voltage-off state, the gel appears bright as the light passing through the cell is scattered from the randomly aligned LC director. Similar observations can be made from the uniform conoscopic image of the cell at 0 V, shown in the inset of FIG. 4(*a*). Subsequently, as the voltage is increased beyond the threshold voltage level, the LC director within the misaligned domains rotates in response to the applied field, as observed in consecutive conoscopic images. Finally, at a sufficient voltage, the director is aligned everywhere along the direction of light propagation, resulting in the complete extinction of light under crossed polarizers. This change in output optical intensity with respect to the applied voltage is used to characterize the threshold voltage ($U_{th}$) and driving voltage ($U_d$) for the CNLC cell (assembly). As can be noticed from FIG. 4(*a*), where the applied voltage is varied in small steps (ΔU=0.1 V), the threshold voltage, $U_{th}$ for a 7 μm thick CNLC cell is found to be about 2.6 V, only slightly higher than that for pure 5CB. However, unlike pure LC cells, the threshold voltage for CNLC increases with cell gap (see FIG. 4(*c*)) which is expected for structured CNLC cells due to the distributed anchoring-based coupling to a 3D network. When measured between crossed polarizers, the output optical intensity becomes extinct around 4.5 V, estimating the value of driving voltage, $U_d$. These measurements are also verified from the direct transmittance versus applied voltage plot in FIG. 4(*b*), where the cell reaches 10% and 90% of maximum transmission at $$U_{th} = 2.72\ V \text{ and } U_d = 4.68\ V,$$

respectively for the optimized cell gap of 7 μm. The low driving voltage is a remarkable property of the CNLC switching, considering at least one order of magnitude higher driving voltage of standard PDLC and PNLC composites used recently. Such voltage reductions in smart window applications would allow operation with about 100 times lower power consumption as this is approximately proportional to the square of the driving voltage. This order of magnitude estimation has been validated experimentally as well. Total energy consumption to run and maintain the 'ON' state is found to be only about 30-45 mW $m^{-2}$ at a frequency range f=10-1000 Hz (see FIG. 4(*d*)), whereas a similar estimation for PDLCs is around 5-20 Wm–2. The lower operating voltages and high steepness in electro-optic response are consistent with the weak anchoring conditions of LC molecules as predicted theoretically.

To understand the observed threshold field and dynamic switching behavior of CNLC gel, a model based on considerations of the mechanical coupling between the network of CNFs and the director of LC was used. The threshold field from this model for CNLC gel system with finite anchoring strength can be expressed as $$E_{th} \cong \sqrt{\frac{2\pi^2 K}{\varepsilon_O \varepsilon_a}\left(\frac{1}{d} + \frac{l}{L + 2K/W}\right)^2} \tag{1}$$

By substituting the average elastic constant K≈5 pN and dielectric anisotropy $\varepsilon_a$=11.5 of 5CB at f=1 kHz, $$\varepsilon_O = 8.85 \times 10^{-12} \text{Fm}^{-1},$$

$U_{th}$=2.74 V for d=7 μm, and L of the order of 100 nm as seen from the CNF-network electron microscopy image, we obtain an estimate of the surface anchoring coefficient $$W \approx 2.2 \times 10^{-6} \text{Jm}^{-2}.$$

To test the validity of the model, the switching response times of the CNLC gel was considered. The threshold field for gel systems is related to the decay time $t_{decay}$ and the rotational viscosity γ by:

$$t_{decay} E_{th}^2 = \frac{\pi^2 \gamma}{\varepsilon_O \varepsilon_a}.$$

So, the decay time can be explicitly written as $$t_{decay} = \frac{\gamma}{2K}\left(\frac{1}{d} + \frac{1}{L + 2K/W}\right)^{-2} \tag{2}$$

Taking the rotational viscosity of 5CB γ≈75 mPa S at 25° C. and $$W \approx 2.2 \times 10^{-6} \text{Jm}^{-2},$$

found based on our model, the decay time is estimated to be $t_{decay}$≈57.85 ms, which we will now verify with experimental measurements on the electrical switching response time of the CNLC gel. Due to weak anchoring to the CNF network, the facile response of 5CB molecules to an applied electric field is fast and comparable to that of a pure LC. With the application of a certain voltage above $U_{th}$, the optical response of the composite varies nonmonotonously with time as shown in FIG. 4(*e*). The rising and decay times are measured based on the intensity changes of directly transmitted light between 10% and 90%, as marked by dotted lines, obtaining the rising time $t_{rise}$=30 ms and decay time $t_{decay}$=60 ms, at 5V in a 7 μm thick cell. With increasing amplitude of the applied voltage, the LC director switches faster, thereby reducing the response time $t_{rise}$, whereas the $t_{decay}$ is independent of the applied voltages as observed in FIG. 4(*f*). The value of $t_{decay}$ from modeling matches closely with the experimentally measured decay time, thereby validating the model and analytical approach overall. These fast switching times, along with low operating voltages, are a key advantage of CNLC gel for applications like privacy windows.

Another important optical property to assess the performance of smart glass is the haze coefficient evaluating the amount of scattered light. In FIG. 5(*a*), we quantify the haze coefficient of the ensuing CNLC gels at different voltages from the ratio of the diffused and total transmission. The high haze coefficient (89.49%) at the passive state decreases drastically with applied voltage and finally reduces to a low value of 2.29%, which meets the stringent requirements for the transparent-state properties of glazing. The low haziness of CNLC gels at applied voltage and the tunability of the haze coefficient with small voltage changes are suitable for applications in privacy windows, daylighting and skylights. In addition, the dependence of direct transmittance on the applied voltage over a broad wavelength range (450-1100 nm) is also revealed. Both of these measurements show threshold-like dependence on the applied voltage, changing rapidly between 2.7 to 4.3 V. From the wavelength dependence of direct transmission in FIG. 5(*b*), one observes that the scattering/haze contrast between ON and OFF states is somewhat weaker for NIR wavelengths as compared to the visible range, though still adequate to allow for also controlling solar gain along with the visible-range transparency.

The ability of tuning haze within 2-90% with very small, applied voltage changes while maintaining the high overall transmission was highly sought-after but not achieved till this work, creating the foundation for our new technological approach dubbed "Haze switch."

We also test the durability of CNLC switching and reproducibility of its performance over various switching cycles. The direct transmittance values at OFF and ON states after every 2000 cycles have been plotted in FIG. 5(*c*). The nearly constant response indicates that the CNLC gel is stable over at least 10000 switching cycles and still exhibits ultra-high ON-state transparency (shown in the inset of FIG. 5(*c*). The composite remains reversible at the end of the cycling test as by a direct transmission vs wavelength plot. The dynamic modulation for ~100 switching cycles has been shown in using a square wave electric signal, which verifies the consistency of the optical modulation over multiple switching cycles. Finally, a tuneability of the visual appearance of the cell with under varying voltage in was verified. The variation of transparency and haziness of an image when observed through the CNLC cell at different voltages is shown in FIG. 5(*d*). During the transition, the exact color of the logo remains unaltered. It is interesting to notice that, if slowly increasing voltage in small steps the transparency switching starts from the center first and then goes outward. However, this effect is absent when the cell is switched at a constant driving voltage, so that the voltage driving scheme can be optimized for the desired uniformity of switching.

Examples of the disclosure provide a network of nanocellulose fibers penetrating a (e.g., nematic) liquid crystal allows for switching an assembly between monodomain and polydomain states, where the latter is strongly scattering, and the former is highly transparent, with both states providing the high overall transmission of light. The composite liquid crystal material enables tuning and fast-switching (subsecond) haze coefficient within a broad range, from 2 to ~90% while maintaining high color-neutral light transmission, leading to the new "Haze-switch" technology. The weak surface anchoring of LC molecules on nanometer-thick cellulose fibers leads to randomly aligned emerging nematic domains that control light transport and associated optical diffusion using just a few volts. Due to low operating voltage and electrical power consumption requirements, the assemblies can be operated by portable devices like a battery or a solar cell, without needing additional electrical wiring in the architecture. Additionally, a solar gain control functionality can be potentially added by doping the CNLC gel. Moreover, the integration of CNLC with other window technologies based on thermal insulating aerogels in a multi-pane design may offer all-in-one solution for energy efficiency as well as privacy control while simultaneously allowing natural light which is critical for human health. The assemblies described herein uniquely combines high visible transmission (even in opaque state) and low haze (~2%) in the clear state as strictly required for window applications. The uniformity in color-neutral appearance and selective tuning of polarization-independent haze is also a desired achievement, which is realized through an electrically tunable method. Since the CNLC gel is made from LC and biopolymer materials, it can be manufactured at a low cost and in a highly scalable way. The orders of magnitude reduction of power consumption along with superior switching contrast, stable performance, simple fabrication and operation, reduced expense and potential scalability make this technology an excellent candidate for power-efficient dynamic smart glass that may additionally reduce the building energy consumption from artificial lighting. Devices based on this low-voltage Haze-switch approach could find applications in various optically switchable technologies, including privacy windows, skylights, daylighting and information security.

The methods provided below further illustrate particular examples. Unless noted otherwise, the invention is not limited to the particular methods presented below.

Synthesis of TEMPO-oxidized cellulose nanofibers. Exemplary TEMPO-oxidized individualized cellulose nanofibers were well-defined rodlike particles with 3-6 nm width and hundreds-to-thousands nanometers length that were synthesized by two a step process. In the first step, TEMPO oxidation of never-dried demineralized hardwood cellulose pulp (Dragons Paper, Rumford Division, USA) was started in a basic medium with a pH of 10. 100 g pulp, TEMPO (28.92 mg, 0.094 mmol), and NaBr (317.64 mg) were added to the suspension, followed by the addition of 1 M NaClO solution (10 ml). When the pH drop was less than 0.01 per minute, the solution was transferred to a high-speed blender and blended for 5-10 minutes at 1500 rpm. The blending process breaks the aggregated cellulose fibers and allows deeper penetration of the oxidation agent into its interior structures. After blending, the solution was returned to stirring and the pH was again adjusted to 10 with 1 m NaOH. This process was repeated until the pH of the solution drops less than 0.5 after blending. The solution was centrifuged several times at 9000 rpm for 20 minutes to free from the excess and unreacted chemicals. The oxidized cellulose nanofibers were then recovered by centrifugation and washed thoroughly with water, and then mechanically ground once again with a high-speed grinder.

The second step started with sonication in Branson Sonifier for 15-50 min at 30% amplitude. Oxidation of the unreacted C6 hydroxyl groups of cellulose into C6 carboxylate groups was further performed using $NaClO_2$ as the primary oxidant, with catalytic amounts of TEMPO and NaClO in water at a pH of 4.8-6.8. TEMPO again allowed for the selective and efficient conversion of the C6 hydroxyl groups. 1 M dibasic sodium phosphate (2.35 ml) and 1 M monobasic sodium phosphate (2.65 ml) solutions were added to 1 g TEMPO-oxidized cellulose nanofiber solution to act as a buffer during the reaction. This was stirred at 500 rpm for approximately 5 minutes and then 20 mL was removed and set aside to dilute the NaClO later before adding it to the reaction vessel. TEMPO (25 mg) and sodium chlorite (1.13 g) were then added to the oxidized cellulose nanofiber dispersions and were stirred at 500 rpm for approximately 20 minutes until these additives were fully dissolved. Sodium hypochlorite (0.455 ml) was then added to the 20 ml separate solution. The diluted sodium hypochlorite was then added to the cellulose nanofibers' dispersion, and the reaction vessel was immediately sealed with a screw lid. The solution was placed in a water bath at room temperature and stirred at 500 rpm for approximately 30 minutes. The water bath was then heated to 60° C. and the reaction was allowed to run continuously for 72 hours. The solution was then again centrifuged repeated times at 9000 rpm for 20 minutes to filter the excess chemicals out. In the final step, the dispersion was sonicated again with Branson Sonifier for 30 min and filtered with Whatman filter paper 2 to get the final oxidized cellulose nanofiber dispersion in water. This modified version of the TEMPO-oxidation of cellulose results in nanofibers of 3-6 nm in width and hundreds to thousands of nanometers in length (e.g., lengths set forth herein). Moreover, these cellulose nanofibers are mechanically flexible and hold high crystallinity and therefore show strong optical anisotropy.

Fabrication of the CNLC cells as Haze-switch devices. Aqueous dispersions of the synthesized nanofibers with concentration 0.5-1 wt % were mixed with silica spacers of desired thickness ranging from 4 μm to 15 μm. A few drops of this mixture were drop casted on a desired substrate. Subsequently, another substrate is placed on top which was then glued to the other substrate with UV-curable NOA-65 glue (Norland Products, Inc.) and formed a uniformly thick cell with the desired cell gap. To initiate gelation, the cell was then immersed overnight in a weak acid solution made from 5 wt % acetic acid. During this step, the fibers were cross-linked to form a 3D network. Once the gelation is completed, the cell was transferred to a water bath and kept at room temperature for another 2 days to wash out the acid. Later, the ensuing hydrogel was dipped inside ethanol and kept at 50° C. for a day for solvent exchange. At last, the CNLC was formed by replacing ethanol from the network with 5CB (Chengzhi Yonghua Display Materials Co. Ltd.) at 60° C. for 3 days. During the solvent exchange process which turned the hydrogel into alcogel and finally into the desired CNLC gel, the fiber network remained unperturbed as we avoided the use of any solvent that could possibly break the hydrogen bonds linking the fibers.

Nanoscale characterization. Transmission electron microscopy (TEM) characterization of the fibers and the ensuing network was done by recording tilt series on a Titan Krios G3i at 300 kV under low dose conditions. SerialEM program was used for the acquisition of the tilt series data and reconstruction of the tomographic data was done using IMOD software. The individualized cellulose nanofibers in aqueous dispersions were negatively stained with 1% phosphotungstic acid before the TEM imaging on a Tecnai ST20 200 kV TEM. To avoid any possibility of alteration of the internal structure during transfers and processing thin films of nanofiber-network were fabricated directly on 300 mesh Au carbon film TEM grids for imaging.

Electro-optical characterization. The total and diffused transmission spectra in the visible region (400-800 nm) was recorded using a spectrometer together with an integrating sphere (Labsphere DRA-CA-5500) having an inside diameter of 150 mm and coated with barium sulfate. The haze coefficient values that quantify the amounts of scattered light, were calculated based on the total and diffused transmission measurements using the integrating sphere following the ASTM D1003 (Standard Test Method for Haze and Luminous Transmittance), commonly used for haze measurements in windows applications. For optical transmittance and haze coefficient measurements, the samples were mounted at the entry port of the integrating sphere, and calibration was done using diffuse reflectance standards. The direct transmission spectra in the 400-1100 nm wavelength range were studied using a portable spectrometer (Silver Nova, from Stellernet Inc.) mounted on the microscope. Broad-spectrum light was collected and analyzed using optical fiber having a 600 μm core diameter. The optical microscopy observations were performed using an Olympus BX-51 upright optical microscope with a 10× and 50× air objective having a numerical aperture of 0.3 and a charge-coupled device camera (Pointgrey).

Electric switching of the composite was characterized using a data acquisition system (USB-6259, from National Instruments Co.) operated by homemade software written in Lab VIEW (from National Instruments Co.), and a Si-amplified photodetector (PDA100A2, from Thorlabs Inc.). A function generator (Instek GFG-8216A) was used as a voltage source at different frequencies. We used a Schlumberger 1260 Impedance gain-phase analyzer with a maximum input voltage of 3 V for measuring the power consumption.

Estimation of power consumption. To study the power consumption of the CNLC cell as a function of frequency the impedance (magnitude and phase) of the cell was measured. We used a typical cell of thickness d=7 μm and electrode area A=6.45 $cm^2$ for the measurements. The sample was scanned over a range of operating frequencies from 10 Hz to 1 kHz at an applied voltage of 3 V. Now, the average dissipated power in ac circuits can be found from:

$$P_{avg}\frac{V_m^2}{2Z}\cos\varphi,$$

where $V_m$ is the applied voltage, Z is the impedance of the circuit and σ is the phase angle between voltage and current.

In this disclosure, any two numbers of a variable can constitute a workable range of the variable, and any ranges indicated may include or exclude the endpoints. Additionally, any values of variables indicated (regardless of whether they are indicated with about or not) may refer to precise values or approximate values and include equivalents, and may refer to average, median, representative, majority, etc. in some embodiments. Further, in this disclosure, the terms including, constituted by and having and related words can refer independently to typically or broadly comprising, comprising, consisting essentially of, or consisting of in some embodiments. Percentages may be relative or absolute percentages. In accordance with aspects of the disclosure, any defined meanings of terms do not necessarily exclude ordinary and customary meanings of the terms. The term about or approximately can be ±10%, ±5%, ±2%, ±1%, or ±0.5% of the recited value(s).

The example embodiments of the disclosure described above do not limit the scope of the invention, since these embodiments are merely examples of the embodiments of the invention. Any equivalent embodiments are intended to be within the scope of this invention. Indeed, various modifications of the disclosure, in addition to the embodiments shown and described herein, such as alternative useful combinations of the elements described, may become apparent to those skilled in the art from the description. Such modifications and embodiments are also intended to fall within the scope of the appended claims.

The invention claimed is:

1. A haze tunable assembly comprising:

a first substrate;

a second substrate;

a composite liquid crystal material interposed between the first substrate and the second substrate;

a first contact layer between the first substrate and the composite liquid crystal material; and a second contact layer between the second substrate and the composite liquid crystal material, wherein the composite liquid crystal material comprises:

liquid crystal material; and a cross-linked unaligned network of nanofibers, and wherein a haze of the composite liquid crystal material can be tuned by applying a bias across the first contact layer and the second contact layer, wherein an average pore size of pores within the cross-linked unaligned network of nanofibers is between about 50 nm and about 200 nm, and wherein emergent domains of the liquid crystal material are larger than the average pore size.

2. The assembly of claim 1, wherein the liquid crystal material is nematic liquid crystal material.

3. The assembly of claim 1, wherein an average diameter of the nanofibers is between about 3 nm and about 6 nm.

4. The assembly of claim 1, wherein the emergent domains of the liquid crystal material are between about 1 μm and about 10 μm.

5. The assembly of claim 1, wherein a total transmission of light of the assembly in the visible and/or near infrared region of the of the electromagnetic spectrum is greater than 80%, greater than 85%, or greater than 89% in both an off state and in an on state.

6. The assembly of claim 5, wherein a difference of the total transmission of light in the visible and/or near infrared region of the of the electromagnetic spectrum in the off state of the assembly is within 10% or within 5% of a transmission of light in the visible and/or near infrared region of the of the electromagnetic spectrum of the assembly in the in on state.

7. The assembly of claim 1, wherein light transmitted through the assembly is polarization-independent.

8. The assembly of claim 1, wherein the liquid crystal material comprises 4-cyano-4'-pentylbiphenyl (5CB), MLC-9200-000, MLC-9200-100, MLC-6608, MLC-6241-000, 5PCH, 5CB, TL-216, E7, or E44.

9. The assembly of claim 1, wherein a haze coefficient of the composite liquid crystal material is less than 10% in an on state and greater than 80% in an off state.

10. The assembly of claim 1, wherein a difference of a haze coefficient of the composite liquid crystal material in an off state and a haze coefficient of the composite liquid crystal material in an on state is greater than 75 absolute percent.

11. The assembly of claim 1, wherein a driving voltage of the assembly is less than 5 V.

12. The assembly of claim 1, wherein the nanofibers comprise cellulose nanofibers.

13. The assembly of claim 1, wherein the composite liquid crystal material further comprises spacers.

14. The assembly of claim 1, wherein a distance between the first substrate and the second substrate is greater than zero and less than 30 micrometers.

15. A method of tuning a haze of a tunable assembly, the method comprising the steps of:

providing an assembly of claim 1; and applying a bias across the first contact layer and the second contact layer to thereby affect a change in a haze coefficient of the composite liquid crystal material of greater than 75 absolute percent.

16. The method of claim 15, wherein a difference of a transmission of light in the visible and/or near infrared region of the of the electromagnetic spectrum in the off state of the assembly is within 10% or within 5% of a transmission of light in the visible and/or near infrared region of the of the electromagnetic spectrum of the assembly in the in on state.

17. The method of claim 15, wherein a total transmission of light in the visible and/or near infrared region of the of the electromagnetic spectrum is greater than 80% in both an off state and in an on state.

18. A window comprising the haze tunable assembly of claim 1.

* * * * *